United States Patent
Carlson et al.

(10) Patent No.: US 11,840,159 B2
(45) Date of Patent: Dec. 12, 2023

(54) TECHNIQUES FOR ADAPTING DUAL-BATTERY START-STOP ARCHITECTURES INTO ADAS REDUNDANT POWER SUPPLIES

(71) Applicants: Michael A Carlson, Davisburg, MI (US); Scott L Radabaugh, Rochester Hills, MI (US)

(72) Inventors: Michael A Carlson, Davisburg, MI (US); Scott L Radabaugh, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 164 days.

(21) Appl. No.: 17/315,639

(22) Filed: May 10, 2021

(65) Prior Publication Data
US 2022/0355704 A1    Nov. 10, 2022

(51) Int. Cl.
*H02J 7/00*    (2006.01)
*B60L 58/19*    (2019.01)
*H02H 3/38*    (2006.01)
*B60W 10/18*    (2012.01)
*B60W 20/20*    (2016.01)
*B60W 30/12*    (2020.01)

(52) U.S. Cl.
CPC ............... *B60L 58/19* (2019.02); *H02H 3/38* (2013.01); *H02J 7/0024* (2013.01); *H02J 7/00041* (2020.01); *H02J 7/0047* (2013.01); *H02J 7/00714* (2020.01); *H02J 7/007182* (2020.01); *B60W 10/18* (2013.01); *B60W 20/20* (2013.01); *B60W 30/12* (2013.01)

(58) Field of Classification Search
CPC ..... B60L 58/19; H02J 7/00041; H02J 7/0047; H02J 7/00714; H02J 7/007182; H02J 7/0024; H02H 3/38; B60W 10/18; B60W 20/20; B60W 30/12
USPC ........................................... 320/109; 701/22
See application file for complete search history.

(56) References Cited

U.S. PATENT DOCUMENTS 9,075,413 B2    7/2015    Cullinane et al.
9,958,865 B2    5/2018    Hoskeri et al.
(Continued)

OTHER PUBLICATIONS

Danny Shapiro, "Leveling Up: What is level 2 Automated Driving?." Feb. 6, 2019, <https://blogs.nvidia.com/blog/2019/02/06/what-is-level-2-automated-driving/> (Year: 2019).*

*Primary Examiner* — Zixuan Zhou
(74) *Attorney, Agent, or Firm* — Jeremy J. Klobucar

(57) ABSTRACT

An electrical system for a vehicle includes a main battery system configured to provide power for starting/cranking an engine of the vehicle, an auxiliary battery system configured to provide power for powering a set of accessory loads of the vehicle during starting/cranking of the engine, and a solid-state device disposed therebetween and including a solid-state switch configured to close/open to connect/disconnect the main and auxiliary battery systems to/from each other and intelligence circuity configured to monitor voltages in the main and auxiliary battery systems or current flowing therethrough and, based on the monitoring, commanding the solid-state switch to open to isolate the other of the main and auxiliary battery systems, wherein the isolated one of the main and auxiliary battery systems is configured to provide a degraded but operational operation of an L2+ autonomous driving feature of the vehicle.

16 Claims, 2 Drawing Sheets

(56) References Cited

U.S. PATENT DOCUMENTS

| | | |
|---|---|---|
| 9,964,949 B2 | 5/2018 | Hay et al. |
| 10,460,394 B2 | 10/2019 | Perl et al. |
| 10,647,319 B2 | 5/2020 | Sato et al. |
| 2018/0229676 A1* | 8/2018 | Hudson .................. B60R 16/03 |
| 2019/0092257 A1* | 3/2019 | Boecker ................. B60R 16/04 |
| 2019/0237987 A1* | 8/2019 | Martell ................. H02J 7/0048 |
| 2020/0156635 A1 | 5/2020 | Dallier et al. |

* cited by examiner

TECHNIQUES FOR ADAPTING DUAL-BATTERY START-STOP ARCHITECTURES INTO ADAS REDUNDANT POWER SUPPLIES

FIELD

The present application generally relates to vehicle electrical systems and, more particularly, to techniques for adapting dual-battery start-stop architectures for automated driver assistance system (ADAS) redundant power.

BACKGROUND

A vehicle having an engine start-stop system typically includes two battery systems: a main battery system and an auxiliary battery system. The main battery system is utilized to crank/start the engine and, during this cranking period, the auxiliary battery system is isolated and utilized to power accessory loads (headlights, heating/ventilation/air conditioning (HVAC), etc.). A relay disposed between these two battery systems only opens during engine cranking, and is otherwise closed such that an alternator/generator connected to the engine is able to recharge both the main and auxiliary battery systems. A short circuit malfunction in one of these battery systems could propagate to the other battery system before this relay is able to open, which could result in both power domains malfunctioning. This could be particularly problematic when advanced driver assistance system (ADAS) or autonomous driving features of the vehicle are engaged. Accordingly, while such vehicle electrical systems do work for their intended purpose, there exists an opportunity for improvement in the relevant art.

SUMMARY

According to one example aspect of the invention, an electrical system for a vehicle is presented. In one exemplary implementation, the electrical system comprises a main battery system comprising a main controller and a main battery configured to provide power for starting/cranking an engine of the vehicle, an auxiliary battery system comprising an auxiliary controller and an auxiliary battery configured to provide power for powering a set of accessory loads of the vehicle during starting/cranking of the engine, and a solid-state device disposed between the main battery system and the auxiliary battery system, the solid-state device including: a solid-state switch configured to close/open to connect/disconnect the main and auxiliary battery systems to/from each other, and intelligence circuity configured to monitor voltages in the main and auxiliary battery systems or current flowing therethrough and, in response to detecting a voltage drop in one of the main and auxiliary battery systems or a current increase that exceeds a respective threshold, commanding the solid-state switch to open to isolate the other of the main and auxiliary battery systems, wherein the isolated one of the main and auxiliary battery systems is configured to provide a degraded but operational operation of an L2+ autonomous driving feature of the vehicle.

In some implementations, the L2+ autonomous driving feature is a lane-centering assist feature, and wherein providing degraded but operational operation of the lane-centering assist feature comprises controlling, using the isolated one of the main and auxiliary battery systems, at least one of a set of steering actuators and a set of brake actuators of the vehicle. In some implementations, at least one of the set of steering actuators and the set of brake actuators are controlled to bring the vehicle to a safe state. In some implementations, the safe state is stopped on a side of a road along which the vehicle is traveling. In some implementations, the safe state is stopped in a center of a lane of a road along which the vehicle is traveling.

In some implementations, the solid-state switch is configured to close/open in a plurality of microseconds. In some implementations, the voltage drop or current increase that exceeds the respective threshold is indicative of a short-circuit malfunction in the corresponding one of the main and auxiliary battery systems. In some implementations, the solid-state switch is commanded closed during non-starting/cranking periods of the engine such that an alternator/generator connected to the engine is able to generate electrical energy for recharging both the main and auxiliary battery systems. In some implementations, the set of accessory loads includes at least one of vehicle headlights and a heating/ventilating/air conditioning (HVAC) system of the vehicle.

According to another example aspect of the invention, a method of controlling an electrical system for a vehicle is presented. In one exemplary implementation, the method comprises providing a main battery system comprising a main controller and a main battery configured to provide power for starting/cranking an engine of the vehicle, providing an auxiliary battery system comprising an auxiliary controller and an auxiliary battery configured to provide power for powering a set of accessory loads of the vehicle during starting/cranking of the engine, providing a solid-state device disposed between the main battery system and the auxiliary battery system, the solid-state device including: a solid-state switch configured to close/open to connect/disconnect the main and auxiliary battery systems to/from each other, and intelligence circuity configured to monitor voltages in the main and auxiliary battery systems and, in response to detecting a voltage drop in one of the main and auxiliary battery systems or a current increase flowing therethrough that exceeds a respective threshold, commanding the solid-state switch to open to isolate the other of the main and auxiliary battery systems, and providing, using the isolated one of the main and auxiliary battery systems, degraded but operational operation of an L2+ autonomous driving feature of the vehicle.

In some implementations, the L2+ autonomous driving feature is a lane-centering assist feature, and wherein providing degraded but operational operation of the lane-centering assist feature comprises controlling, using the isolated one of the main and auxiliary battery systems, at least one of a set of steering actuators and a set of brake actuators of the vehicle In some implementations, at least one of the set of steering actuators and the set of brake actuators are controlled to bring the vehicle to a safe state. In some implementations, the safe state is stopped on a side of a road along which the vehicle is traveling. In some implementations, the safe state is stopped in a center of a lane of a road along which the vehicle is traveling.

In some implementations, the solid-state switch is configured to close/open in a plurality of microseconds. In some implementations, the voltage drop or current increase that exceeds the threshold is indicative of a short-circuit malfunction in the corresponding one of the main and auxiliary battery systems. In some implementations, the solid-state switch is commanded closed during non-starting/cranking periods of the engine such that an alternator/generator connected to the engine is able to generate electrical energy for recharging both the main and auxiliary battery systems.

In some implementations, the set of accessory loads includes at least one of vehicle headlights and an HVAC system of the vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Autonomous driving is traditionally divided into six levels L0-L5, with L0 being no automation and L5 being full automation and L1-L4 being varying degrees of automation therebetween. L1 and L2 autonomous driving typically relates to automated driver assistance systems (ADAS) and partial automation. L3 autonomous driving relates to conditional hands-off automation, which could require a driver takeover under certain conditions. L2+ refers to the growing area between L2 and L3 autonomous driving, and one good example of L2+ autonomous driving is lane-centering assist. In L2+ lane-centering assist, map data enables lane-centering to remain effective even in areas where sensor-only lane centering systems may have difficulty (e.g., in areas without visible lane marks or low-quality lane markings). L2+ lane-centering assist also supports automatic lane changes by providing information such as lane-marking types and adjusting the vehicle drive speed. While L2+ lane-centering assist is primarily described herein, it will be appreciated that the techniques/systems of the present application could be applicable to providing degraded but operational operation of other L2+ or other level autonomous driving features. As previously discussed, conventional vehicle electrical systems could suffer from a short-circuit malfunction in both battery systems, which could interrupt L2+ autonomous driving feature operation.

Accordingly, an improved vehicle electrical system is presented that provides for degraded but operational L2+ autonomous driving feature operation. This degraded but operational L2+ autonomous driving feature operation is achievable using an isolated main or auxiliary battery system after a short-circuit malfunction occurs and is detected in the other of the two battery systems. While L2+ autonomous driving (e.g., lane-centering assist) is specifically described herein, it will be appreciated that this term could also encompass higher-level autonomous driving features (e.g., L3 operation). This isolation is monitored and quickly achieved using a solid-state device (e.g., closed-to-open in a plurality of microseconds) disposed between the main and auxiliary battery circuits that comprises a solid-state switch that is commanded open to isolate the two battery systems from each other and is otherwise closed to allow an alternator/generator powered by an engine of the vehicle to recharge both main and auxiliary battery systems. The solid-state device includes intelligence circuitry that monitors the voltages in both of the main and auxiliary battery systems or current flowing therethrough and commands the solid-state switch open when a voltage drop exceeding a respective threshold (e.g., indicative of a short-circuit malfunction) is detected in the main or auxiliary battery system or a current increase (magnitude or rate of change) flowing therethrough exceeds a respective threshold (e.g., similarly indicative of a short-circuit malfunction).

Figure 1:
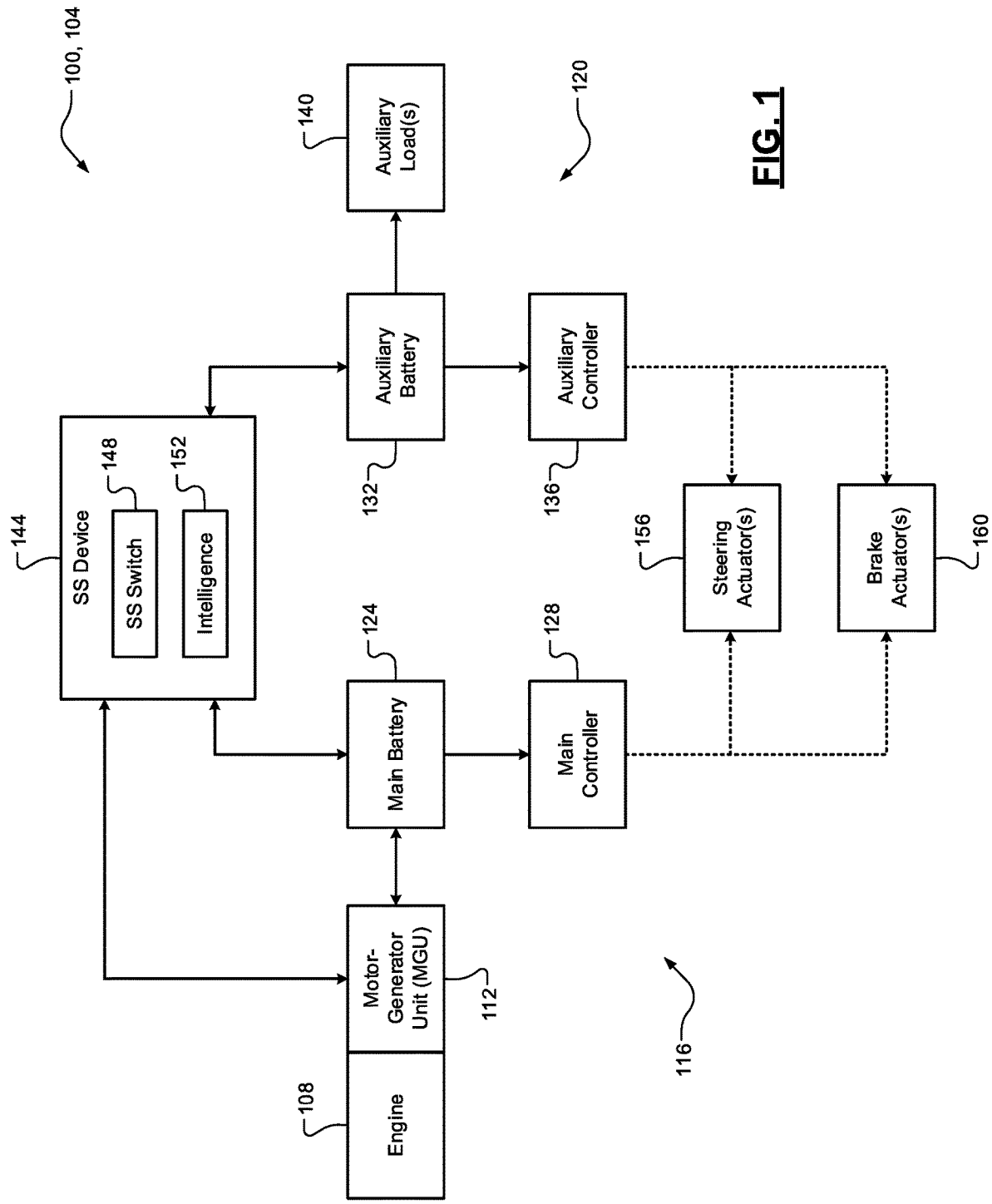
FIG. 1 is a functional block diagram of an example vehicle electrical system configured for engine start/stop and an L2+ advanced driver assistance system (ADAS)/autonomous driving feature according to the principles of the present application.

Referring now to FIG. 1, a functional block diagram of an example electrical system 104 of a vehicle 100 according to the principles of the present application is illustrated. The vehicle 100 comprises at least an engine 108 for combusting an air/fuel mixture to drive a crankshaft and generate drive torque for vehicle propulsion. It will be appreciated that the vehicle 100 could comprise other powertrain components, such as one or more electric traction motors (not shown). The engine 108 is selectively connected to a motor-generator unit (MGU) 112 configured to both start/crank the engine 108 (e.g., as part of engine start/stop operation) and to generate electrical energy (similar to an alternator) while the engine 108 is running for recharging main and auxiliary battery systems 116, 120. It will be appreciated that a standard alternator is also a suitable configuration. The main battery system 116 comprises a main battery 124 and a main controller 128. The main battery 124 is primarily configured to power the MGU 112 for engine starting/cranking and is also configured to be recharged by the MGU 112 while the engine 108 is running. The main controller 128 is primarily configured to control operation of the main battery system 116 and could also control operation of the engine 108 and the MGU 112. The auxiliary battery system 120 comprises an auxiliary battery 132 that is less powerful than the main battery 124 and an auxiliary controller 136.

The auxiliary battery 132 is primarily configured to power a set of accessory loads 140 (i.e., low-voltage loads). Non-limiting examples of the accessory load(s) include vehicle headlights and a vehicle HVAC system. These accessory load(s) are powered by the auxiliary battery system 120 only during starting/cranking of the engine 108 such that there is not a voltage/power drop at the accessory load(s) 140 140 that could be noticeable and unpleasant to the driver (e.g., a flickering of the vehicle headlights). The auxiliary controller 136 is primarily configured to control the accessory load(s) 140. A solid-state (SS) device 144 is disposed between the main and auxiliary battery systems 116, 120. The solid-state device 144 comprises a solid-state (SS) switch 148 (e.g., a fast-switching transistor, such as a metal-oxide-semiconductor field-effect transistor, or MOSFET) that closes/opens to connect/disconnect the main and auxiliary battery systems 116, 120 from each other. When open, the main and auxiliary battery systems 116, 120 are electrically isolated from each other and, when closed, the main and auxiliary battery systems 116, 120 are electrically connected to each other (e.g., such that the MGU 112 is capable of recharging both the main and auxiliary batteries 124, 132).

The solid-state device 144 also comprises a control or intelligence circuit 152. This intelligence circuit 152 is configured to monitor voltages in both the main and auxiliary battery systems 116, 120. It will be appreciated that the intelligence circuit 152 could include other components that are not specifically illustrated (e.g., voltage measurement devices) and could also measure other parameters (i.e., other than voltages in the respective circuits), such as a current flowing through the solid-state device 144. In response to detecting a voltage drop in one of the main and auxiliary battery systems 116 that exceeds a threshold, 120, the intelligence circuit 152 is configured to command the solid-state switch 148 to close thereby isolating the other of the main and auxiliary battery systems 116, 120. This voltage drop could be a voltage magnitude drop exceeding a threshold or a rate of voltage drop exceeding a threshold.

The threshold is indicative of a short-circuit or other similar malfunction in one of the main and auxiliary battery systems 116, 120. The purpose of monitoring for this and then quickly opening the solid-state switch 148 (e.g., in a plurality of microseconds) is to isolate the other of the main and auxiliary battery systems 116, 120 to prevent the short-circuit or other malfunction from propagating to the other system thereby rendering the vehicle 100 (and specifically the L2+ ADAS/autonomous driving feature) inoperable. By keeping the two battery systems 116, 120 connected normally (i.e., outside of short-circuit malfunctions), the two batteries 124, 132 can balance their charges and can be charged by a single charging device (e.g., MGU 112 or an alternator) thereby saving cost. This also spreads cold engine start loads and ignition-off draw (IOD) current across both batteries 124, 132 thereby greatly improving performance.

By isolating one of the main and auxiliary battery systems 116, 120 in this situation, the respective controller (the main controller 128 or the auxiliary controller 136) is then able to control the L2+ ADAS/autonomous driving feature such that its operation is degraded but still operational. The term degraded but operational as used herein refers to, for example, the system having to execute an emergency braking maneuver, and bring the vehicle to a stop in the lane (i.e., which a degraded but operational version of lane-centering assist). It will be appreciated that an alternate configuration could include the auxiliary controller 136 controlling the main battery system 116 and the main controller 128 controlling the auxiliary battery system 120.

As previously mentioned, one exemplary implementation is a lane-centering assist feature. For lane-centering assist, the controller 128 or 136 controls at least one of a set of steering actuators 156 and a set of braking actuators 160 of the vehicle 100. This could include, for example, controlling at least one of the set of steering actuators 156 and the set of braking actuators 160 to bring the vehicle 100 to a safe state. This safe state could be, for example, the vehicle 100 being stopped on a side of a road along which the vehicle is/was traveling or the vehicle 100 being stopped in a center of a lane of a road along which the vehicle is traveling. This is an improvement over conventional systems that require expensive redundant power supplies (e.g., supercapacitors) and that may also lock steering or systems that require much more complex safe state maneuvering (e.g., navigation all the way back to a central depot).

Figure 2:
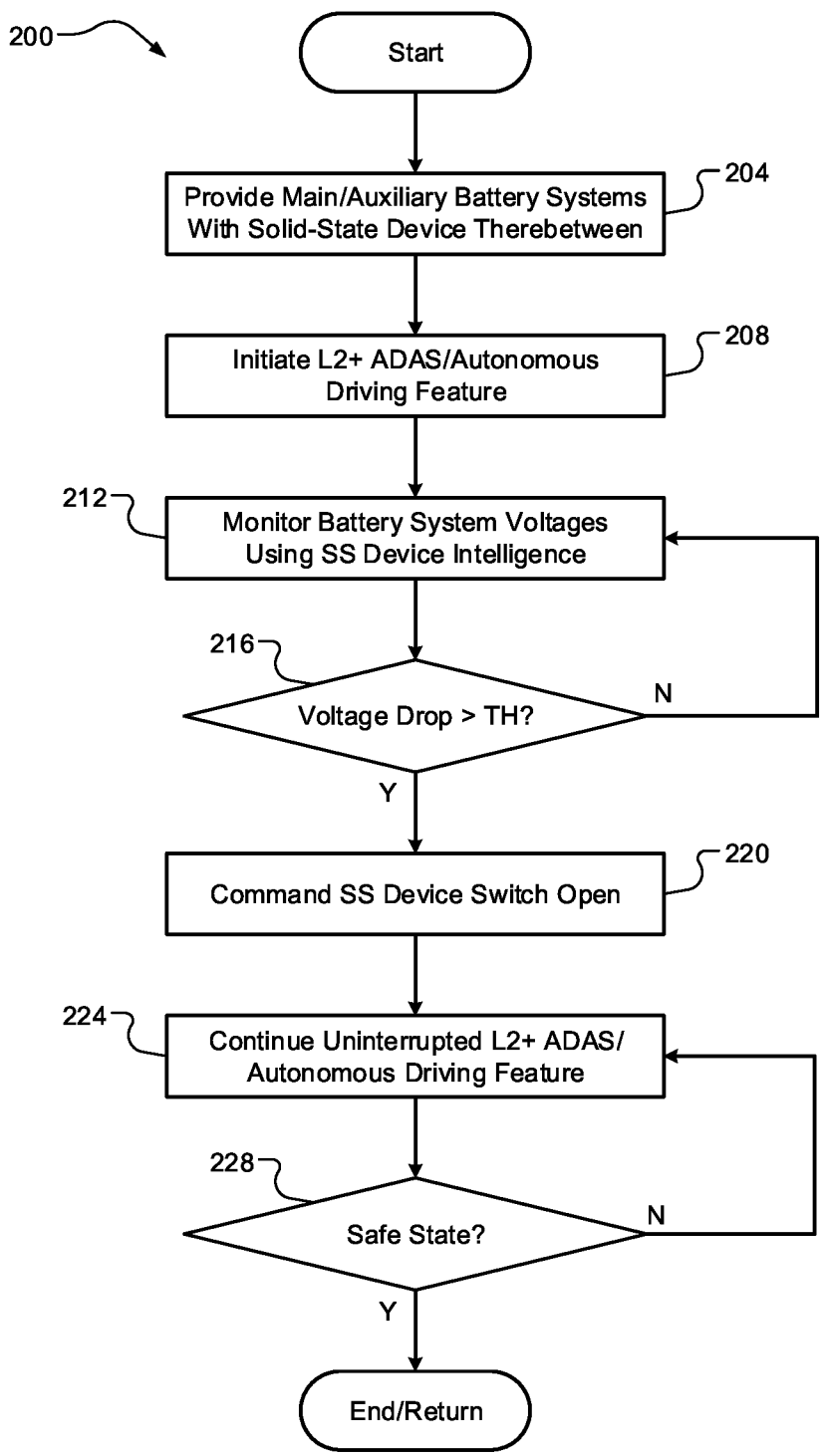
FIG. 2 is a flow diagram of an example method of operating a vehicle electrical system to isolate one of two battery systems after a short-circuit malfunction for degraded but operational L2+ ADAS/autonomous driving feature operation according to the principles of the present application.

Referring now to FIG. 2, a flow diagram of an example method 200 of operating a vehicle electrical system to isolate one of two battery systems after a short-circuit malfunction for degraded but operational L2+ ADAS/autonomous driving feature operation according to the principles of the present application is illustrated. While the vehicle 100 and its components are specifically referenced, it will be appreciated that this method 200 could be applicable to other suitable vehicles having two battery systems and L2+ ADAS/autonomous driving feature functionality. At 204, the main and auxiliary battery systems 116, 120 with the solid-state device 144 therebetween are provided as part of the vehicle electrical system 104. At 208, the vehicle 100 initiates an L2+ ADAS/autonomous driving feature (e.g., lane-centering assist). This could involve the main controller 128, the auxiliary controller 136, or some combination thereof. In one implementation, the L2+ ADAS/autonomous driving feature routines are redundantly stored in both the main and auxiliary controllers 128, 136 (e.g., in non-volatile memory).

At 212, the solid-state device 144 monitors voltages in the main and auxiliary battery systems 116, 120. At 216, the solid-state device 144 (the intelligence circuit 152) determines whether a voltage drop exceeding a respective threshold has occurred in one of the main and auxiliary battery systems 116, 120 or a current increase flowing therethrough (magnitude or rate of change) exceeding a respective threshold has occurred. When false, the method 200 returns to 212 where voltage/current monitoring continues. When true, however, the method 200 proceeds to 220 where the solid-state device 144 (the intelligence circuit 152) commands the solid-state switch 148 open (e.g., in a plurality of microseconds) to thereby isolate the other of the main and auxiliary battery systems 116, 120.

At 224, degraded but operational operation of the L2+ ADAS/autonomous driving feature is provided using the respective controller 128 or 136 of the isolated one of the main and auxiliary battery systems 116, 120. At 228, the controller 128 or 136 determines whether the vehicle 100 has reached the prescribed safe state. When false, the method 200 returns to 224 until the safe state is reached. When true, the method 200 then ends or returns for another cycle (e.g., after the short-circuit malfunction has been cleared).

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An electrical system for a vehicle, the electrical system comprising:
 a main battery system having a main controller and a main battery configured to provide power for starting/cranking an engine of the vehicle;
 an auxiliary battery system having an auxiliary controller and an auxiliary battery configured to provide power for powering a set of accessory loads of the vehicle during starting/cranking of the engine; and a solid-state device disposed between the main battery system and the auxiliary battery system, the solid-state device including:
    a solid-state switch configured to close/open to connect/disconnect the main and auxiliary battery systems to/from each other; and
    intelligence circuitry configured to:
        monitor voltages in the main and auxiliary battery systems or current flowing therethrough;
        detect a transient voltage drop or a transient current increase exceeding a respective threshold in one of the main and auxiliary battery systems, each being indicative of a short-circuit malfunction beginning to occur, wherein the transient voltage drop and the transient current increase are rates of change of voltage/current during respective transient periods across which the voltage/current is changing; and
        in response to detecting the transient voltage drop or the transient current increase, command the solid-state switch to open to isolate the other of the main and auxiliary battery systems before the short-circuit malfunction renders one or both of the main and auxiliary battery systems unable to fully support an L2+ autonomous driving feature of the vehicle, wherein the isolated one of the main and auxiliary battery systems is configured to provide a degraded but operational operation of the L2+ autonomous driving feature of the vehicle.

2. The electrical system of claim 1, wherein the L2+ autonomous driving feature is a lane-centering assist feature, and wherein providing degraded but operational operation of the lane-centering assist feature comprises controlling, using the isolated one of the main and auxiliary battery systems, at least one of a set of steering actuators and a set of brake actuators of the vehicle.

3. The electrical system of claim 2, wherein at least one of the set of steering actuators and the set of brake actuators are controlled to bring the vehicle to a safe state.

4. The electrical system of claim 3, wherein the safe state is stopped on a side of a road along which the vehicle is traveling.

5. The electrical system of claim 3, wherein the safe state is stopped in a center of a lane of a road along which the vehicle is traveling.

6. The electrical system of claim 1, wherein the solid-state switch is configured to close/open in a plurality of microseconds.

7. The electrical system of claim 1, wherein the solid-state switch is commanded closed during non-starting/cranking periods of the engine such that an alternator/generator connected to the engine is able to generate electrical energy for recharging both the main and auxiliary battery systems.

8. The electrical system of claim 1, wherein the set of accessory loads includes at least one of vehicle headlights and a heating/ventilating/air conditioning (HVAC) system of the vehicle.

9. A method of controlling an electrical system for a vehicle, the method comprising:
    providing a main battery system comprising a main controller and a main battery configured to provide power for starting/cranking an engine of the vehicle;
    providing an auxiliary battery system comprising an auxiliary controller and an auxiliary battery configured to provide power for powering a set of accessory loads of the vehicle during starting/cranking of the engine;
    providing a solid-state device disposed between the main battery system and the auxiliary battery system, the solid-state device including:
        a solid-state switch configured to close/open to connect/disconnect the main and auxiliary battery systems to/from each other; and
        intelligence circuitry configured to:
            monitor voltages in the main and auxiliary battery systems;
            detect a transient voltage drop or a transient current increase exceeding a respective threshold in one of the main and auxiliary battery systems, each being indicative of a short-circuit malfunction beginning to occur, wherein the transient voltage drop and the transient current increase are rates of change of voltage/current during respective transient periods across which the voltage/current is changing; and
            in response to detecting the transient voltage drop or the transient current increase, command the solid-state switch to open to isolate the other of the main and auxiliary battery systems before the short-circuit malfunction renders one or both of the main and auxiliary battery systems unable to fully support an L2+ autonomous driving feature of the vehicle; and
    providing, using the isolated one of the main and auxiliary battery systems, degraded but operational operation of the L2+ autonomous driving feature of the vehicle.

10. The method of claim 9, wherein the L2+ autonomous driving feature is a lane-centering assist feature, and wherein providing degraded but operational operation of the lane-centering assist feature comprises controlling, using the isolated one of the main and auxiliary battery systems, at least one of a set of steering actuators and a set of brake actuators of the vehicle.

11. The method of claim 10, wherein at least one of the set of steering actuators and the set of brake actuators are controlled to bring the vehicle to a safe state.

12. The method of claim 11, wherein the safe state is stopped on a side of a road along which the vehicle is traveling.

13. The method of claim 11, wherein the safe state is stopped in a center of a lane of a road along which the vehicle is traveling.

14. The method of claim 9, wherein the solid-state switch is configured to close/open in a plurality of microseconds.

15. The method of claim 9, wherein the solid-state switch is commanded closed during non-starting/cranking periods of the engine such that an alternator/generator connected to the engine is able to generate electrical energy for recharging both the main and auxiliary battery systems.

16. The method of claim 9, wherein the set of accessory loads includes at least one of vehicle headlights and a heating/ventilating/air conditioning (HVAC) system of the vehicle.

* * * * *